US010701893B1

(12) United States Patent
Neace (10) Patent No.: US 10,701,893 B1
(45) Date of Patent: Jul. 7, 2020

(54) LITTER BOX (71) Applicant: Robert W. Neace, Vancouver, WA (US)

(72) Inventor: Robert W. Neace, Vancouver, WA (US)

( * ) Notice: Subject to any disclaimer, the term of this patent is extended or adjusted under 35 U.S.C. 154(b) by 309 days.

(21) Appl. No.: 15/646,079

(22) Filed: Jul. 10, 2017

(51) Int. Cl.
*A01K 1/01* (2006.01)
*B07B 1/28* (2006.01)
*A01K 1/015* (2006.01)

(52) U.S. Cl.
CPC .............. *A01K 1/0114* (2013.01); *B07B 1/28* (2013.01); *A01K 1/0155* (2013.01)

(58) Field of Classification Search
CPC ....... A01K 1/0114; A01K 1/0107; A01K 1/01
See application file for complete search history.

(56) References Cited

U.S. PATENT DOCUMENTS

| 3,793,988 | A | 2/1974 | Traeger |
| 3,908,597 | A | 9/1975 | Taylor |
| 3,941,090 | A | 3/1976 | Fry |
| 4,096,827 | A | 6/1978 | Cotter |
| 4,325,325 | A | 4/1982 | Larter |
| 4,602,593 | A | 7/1986 | Gross |
| 4,616,598 | A | 10/1986 | Burniski et al. |
| 4,886,014 | A | 12/1989 | Sheriff |
| 5,168,834 | A | 12/1992 | Buschur |
| 5,181,480 | A | 1/1993 | Dabolt |
| 5,188,064 | A | 2/1993 | House |
| 5,216,979 | A | 6/1993 | Sallee et al. |
| 5,394,833 | A | 3/1995 | Glass |
| 5,662,066 | A | 9/1997 | Reitz |
| 5,755,182 | A * | 5/1998 | Brown, Jr. ........... A01K 1/0114 119/165 |
| 5,927,049 | A | 7/1999 | Simard |

(Continued)

FOREIGN PATENT DOCUMENTS

| CA | 2955134 | 5/2017 |
| CN | 105638488 | 6/2016 |
| DE | 3243697 A1 * | 5/1984 ........... A01K 1/0107 |

OTHER PUBLICATIONS

Google Machine translation of Chinese Patent No. CN105638488 to Liu, "Kind of Pet Cat Litter Box," as early as Sep. 20, 2019, published on the internet at https://patents.google.com/patent/CN105638488B/en?oq=cn105638488, 6 pages.

(Continued)

*Primary Examiner* — Kristen C Hayes
(74) *Attorney, Agent, or Firm* — Green, Howard & Mughal, LLP; Karen Dana Oster (57) ABSTRACT

A litter box described herein includes a main compartment, a contaminant compartment, and a grate separator dividing the main compartment and the contaminant compartment. The main compartment is above the grate separator and the contaminant compartment is below the grate separator. Powderizable litter in the main compartment is supported by the grate separator when the powderizable litter is in a large initial form. The powderizable litter in the main compartment drops through the grate separator into the contaminant compartment when the powderizable litter transforms to a small powder form leaving clean powderizable litter in the main compartment.

15 Claims, 9 Drawing Sheets

(56) References Cited

U.S. PATENT DOCUMENTS

| | | | |
|---|---|---|---|
| 6,055,935 A | 5/2000 | Engel | |
| 6,082,302 A | 7/2000 | Thaler et al. | |
| 6,408,790 B1 * | 6/2002 | Maguire | A01K 1/0114 119/165 |
| 6,701,868 B1 | 3/2004 | Shepherd | |
| 6,745,720 B2 | 6/2004 | Rasner et al. | |
| 6,997,137 B1 | 2/2006 | Ricke | |
| 7,055,460 B2 * | 6/2006 | Sjogren | A01K 1/0114 119/166 |
| 7,647,889 B2 | 1/2010 | Horanoff | |
| 8,555,817 B2 | 10/2013 | Gordon et al. | |
| 8,555,818 B2 | 10/2013 | Gordon et al. | |
| 8,757,094 B2 | 6/2014 | Baxter et al. | |
| 9,526,226 B2 | 12/2016 | Plazarte et al. | |
| 2008/0022938 A1 * | 1/2008 | Callan | A01K 1/0107 119/165 |
| 2008/0314328 A1 * | 12/2008 | Johnson | A01K 1/0114 119/166 |
| 2010/0043717 A1 * | 2/2010 | Walker | A01K 1/0114 119/167 |
| 2011/0315084 A1 | 12/2011 | Miller | |
| 2018/0325074 A1 | 11/2018 | Thompson | |

OTHER PUBLICATIONS

Heavy, "Top 10 Best Self Cleaning Litter Boxes," http://heavy.com/pets/2016/05/top-best-self-cleaning-litter-box-automatic-litter-box-reviews/, 19 pages, May 16, 2017.

Kickstarter, "Kitty LitterBowl, Think Outside the Cat Litter Box," https://www.kickstarter.com/projects/rvgems/kitty-litterbowl-think-outside-the-cat-litter-box?ref=nav_search&result=project&term=traci%20thompson#prototype-slide-37209, 8 pages, at least as early as Feb. 8, 2017.

Google Machine translation of Chinese Patent No. 105638488 to Liu, "Kind of Pet Cat Litter Box," https://patents.google.com/patent/CN105638488B/en?oq=cn105638488, 6 pages.

* cited by examiner

LITTER BOX

BACKGROUND OF THE INVENTION

The present invention relates generally to a litter box, and particularly to a litter box in which soiled litter passes through a grate leaving clean litter behind.

Cats and other primarily indoor animals are typically trained to use a litter box for elimination of both liquid waste (e.g. urine) and solid waste (e.g. excrement). Liquid waste and solid waste are jointly referred to as "wastes." When an animal uses a litter box, previously "clean" litter is now "soiled" litter. It should be noted that, in general, not all the litter in the litter box is soiled when an animal uses the litter box. Only the litter that has touched and/or absorbed the wastes is soiled litter. Removal of the waste and the soiled litter leaves clean litter.

Whereas litter boxes used to be filled with sand or ashes, litters are now made from a wide variety of materials such as clay, corn, silica gel crystals, recycled paper, wheat hulls, walnut shells, grass, and bark. One of the most common litters is "clumping" litter. Clumping litter (typically bentonite) is highly absorbent and forms solid clumps when liquid waste touches it. Examples of clumping litter are described in U.S. Pat. No. 5,188,064 to House and U.S. Pat. No. 6,745,720 to Rasner et al. Examples of commercially available clumping litter include PURINA® TIDY CATS® 24/7 Performance Clumping Cat Litter, sWHEAT SCOOP® Multi-Cat All-Natural Clumping Cat Litter, and ARM & HAMMER® SUPER SCOOP™ Clumping Litter. Although clumping litter makes litter box scooping and cleaning easy, it is dusty, non-biodegradable, and heavy. Clumping litter is also expensive. As an example, a month's worth of clumping litter for a single cat may cost between $10 and $40. Non-clumping clays are generally cheaper, but tend to get dirty faster because it is easy to leave bits of moist litter behind during removal.

Wood pellet litter may be made from lumber scraps that are heat-treated to remove toxins, oils, and allergens. Examples of wood pellet litter are described in U.S. Pat. No. 3,941,090 to Fry and U.S. Pat. No. 5,927,049 to Simard. An example of commercially available wood pellet litter is Dry Den™ Animal Bedding with Zeolites. Wood pellet litter has a naturally appealing scent (which helps control odor). On the other hand, wood pellet litter turns to "sawdust" when it gets wet. This "powderization" of the pellets makes it at least extremely difficult to remove liquid waste, particularly with scooping (including automated scooping). Wood pellet litter, therefore, must regularly be replaced in its entirety (as opposed to just removing the waste and the soiled litter). Compared to clumping litter and most other types of litter, wood pellet litter is relatively cheap. For example, assuming that all the wood pellet litter must be removed and replaced on a daily basis, as an example, a month's worth of wood pellet litter for a single cat may cost between $4 and $12.

Both manual litter boxes and automated litter boxes (also referred to as self-cleaning or automatic litter boxes) may use a physical separation process (e.g. raking or sifting) to separate the wastes and soiled litter from the clean litter. These separating litter boxes usually take advantage of the fact that the litter particles are considerably smaller than the solid waste. Further, these litter boxes use clumping litter that can be handled in the same fashion as the solid waste. (Without clumping litter, it is difficult or impossible to separate physically liquid waste or litter exposed to liquid waste from clean litter.) Physical separation of the small clean litter from the solid waste and the soiled litter (e.g. the litter clumped from its association with the liquid waste) is generally achieved by having the small clean litter pass through perforations that are sized to be large enough to let the clean litter pass through easily and yet small enough to retain the solid waste and soiled litter.

In using a manual litter box, solid waste and soiled litter is manually raked or sifted to leave clean litter behind. One example of this type of litter box is shown U.S. Pat. No. 4,325,325 to Larter, which describes two matching interconnecting litter boxes and a removable, perforated, separator plate that is placed between the boxes. Upon inverting the boxes, the separator removes the solid waste from the first container by allowing only the "cleansed" litter to flow through the perforated plate and into the second container. Another example is U.S. Pat. No. 3,908,597 to Taylor. This patent describes a litter box having double boxes with perforated bottoms and a slide-out solid divider. Removing the slide-out divider allows the "cleansed" litter to flow from one container to the other, at which point the top container is removed and the solid waste disposed of. The top container is then replaced with a cap and the whole stack inverted to repeat the process. Other patents for manual pet litter boxes (although some incorporate movable parts activated by handles, cranks, or levers) include U.S. Pat. No. 4,602,593 to Gross, U.S. Pat. No. 4,616,598 to Burniski et al., and U.S. Pat. No. 5,168,834 to Buschur. With manual litter boxes, owners may forget to clean the waste from the litter so that, in a relatively short time, the litter box may become full, may begin to smell, or both.

Animal owners often use automated litter boxes. Automated litter boxes, like manual litter boxes, may use a physical separation process (e.g. raking or sifting) to separate the wastes and soiled litter from the clean litter. For example, automated litter boxes may include a rake or comb that is normally maintained in a storage position at one end of the litter box. This rake is moved through the litter material in the litter box, and at the discharge end of the litter box the rake can move up and out of the litter material, discharging any clumps of waste collected by the rake into a disposal receptacle. Upon completion of the waste removal, the rake moves back to the storage position. Examples of automated litter boxes include those described in U.S. Pat. No. 4,096,827 to Cotter, U.S. Pat. No. 4,886,014 to Sheriff, U.S. Pat. No. 5,662,066 to Reitz, U.S. Pat. No. 6,082,302 to Thaler et al., U.S. Pat. No. 6,701,868 to Shepherd, U.S. Pat. No. 7,647,889 to Horanoff, U.S. Pat. No. 8,757,094 to Baxter et al., and U.S. Pat. No. 9,526,226 to Plazarte et al. Problems with these automated rake machines include rakes getting stuck, clumps of waste and/or litter sticking to the rake and/or the floor, the rake becoming dislodged, the rake not moving the waste all the way out of the portion that holds the litter, or a combination thereof. Other automated litter boxes rotate and sift the waste from the litter so that the clean litter is retained in the portion that holds the litter and the waste is emptied into the portion that receives the waste.

BRIEF SUMMARY OF THE INVENTION

The present invention relates generally to a litter box, and particularly to a litter box in which soiled litter passes through a grate leaving clean litter behind.

Described herein is a litter box that includes a main compartment, a contaminant compartment, and a grate separator dividing the main compartment and the contaminant compartment. The main compartment is above the grate separator and the contaminant compartment is below the grate separator. Powderizable litter in the main compartment is supported by the grate separator when the powderizable litter is in a large initial form. The powderizable litter in the main compartment drops through the grate separator into the contaminant compartment when the powderizable litter transforms to a small powder form leaving clean powderizable litter in the main compartment.

One exemplary preferred passage is into the contaminant compartment. Another exemplary passage may be between the main compartment and the contaminant compartment. Yet another exemplary passage is defined through the grate separator between the main compartment and the contaminant compartment. Finally, another exemplary passage is a chute that creates a passage through the grate separator between the main compartment and the contaminant compartment.

For some preferred litter boxes, the contaminant compartment may be a removable contaminant compartment. Some preferred litter boxes include a frame for supporting the main compartment above the contaminant compartment. Some preferred litter boxes include a vibrator for vibrating at least the grate separator.

The powderizable litter in the contaminant compartment supported by the grate separator may provide an odor barrier.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

BRIEF DESCRIPTION OF THE SEVERAL VIEWS OF THE DRAWINGS

The accompanying drawings illustrate various exemplary litter boxes and/or provide teachings by which the various exemplary litter boxes are more readily understood.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Described herein are litter boxes 100 that are able to use powderizable litter 110 (e.g. wood pellet litter) that transforms to "powder" or "sawdust" when it gets wet. Powderizable litter 110 (which has a large initial form 110a, an intermediary form 110b, and a small powder form 110c) is relatively inexpensive and has a naturally appealing scent (which helps control odor). Traditional litter boxes, however, cannot efficiently use powderizable litter 110 because these traditional litter boxes are designed to physically separate soiled litter by separating (e.g. scooping, sifting, or raking) using a separator (e.g. scoop, sifter, or rake) that gathers, moves, or picks up large waste (e.g. solid waste or clumped soiled litter), but leaves behind the small litter. If powderizable litter 110 were used in a traditional litter box, the soiled powderized litter 110c would be left behind with the clean litter if the only form of removal was traditional physical separation. The litter boxes 100 described herein take advantage of the advantages of the powderizable litter 110 and operate on a completely different principle than traditional litter boxes. Instead of using a separator for capturing and removing soiled litter, the litter box 100 described herein uses a separator (grate separator 120) that allows soiled litter (powderizable litter 110) to pass therethrough leaving clean litter (the powderizable litter 110 in its initial form 110a) behind.

Exemplary litter boxes 100, 200 described herein include a main compartment 102, 202 (that may be divided into a pellet sub-compartment 102a and a funnel sub-compartment 102b) and a removable contaminant compartment 104, 204. The removable contaminant compartment 104, 204 is separated from the main compartment 102, 202 by a grate separator 120, 220. Additional details are discussed below.

Exemplary litter boxes 100 may be better understood with reference to the drawings, but these shown litter boxes are not intended to be of a limiting nature. The same reference numbers will be used throughout the drawings and description in this document to refer to the same or like parts. The shown shapes and relative dimensions are preferred, but are not meant to be limiting unless specifically claimed, in which case they may limit the scope of that particular claim.

Before describing the litter boxes and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

- The phrase "powderizable litter 110" is defined as a substance for use in a litter box that has multiple forms: a large initial form 110a (referred to generally as "pellet litter 110a"), an intermediary form 110b, and a small powder form 110c (referred to generally as "soiled powderized litter 110c"). Powderizable litter 110 may be wood pellet litter (described in the Background) that transforms from an original pellet form to a sawdust (powder) form when the wood pellets get wet.
- The term "compartment" is used to describe an enclosure. The enclosure does not necessarily have to be completely enclosed (i.e. a lid is not necessary). The term "sub-compartment" is used to describe a portion of a compartment. It should be noted that although described separately, the sub-compartments might be integral. For example, the main compartment 102 is divided into a pellet sub-compartment 102a and a funnel sub-compartment 102b. These two sub-compartments may be distinct components and/or may be an integral unit. Similarly, just because compartments are described separately does not mean that they cannot be integral. For example, the main compartment 102 and the optional storage compartment may be a single (albeit, most likely divided) unit. Other components that are described separately can be combined to form a single component. Similarly, other components that are described as integral can be divided into multiple components.
- The term "interact" is defined to mean mechanically engage either directly or indirectly. For example, a pellet sub-compartment 102a that interacts with a removable contaminant compartment 104 may be indirectly connected (via the funnel sub-compartment 102b) or may be directly connected.
- The term "associated" is defined to mean integral or original, retrofitted, attached, connected (including functionally connected), positioned near, and/or accessible by. For example, a pellet sub-compartment 102a is associated with the contaminant compartment 104 even though the association may be indirect (e.g. via the funnel sub-compartment 102b) or the contaminant compartment 104 is a removable contaminant compartment 104 (and, therefore, the association is not a permanent association).
- It should be noted that relative terms are meant to help in the understanding of the technology and are not meant to limit the scope of the invention. For example, the term "top" is meant to be relative to the term "bottom," and the term "front" is meant to be relative to the term "back." Rotation of the system or component that would change the designation might change the terminology, but not the concept.
- Terms such as "may," "might," "can," and "could" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation.
- Unless specifically stated otherwise, the term "exemplary" is meant to indicate an example, representation, and/or illustration of a type. The term "exemplary" does not necessarily mean the best or most desired of the type.
- It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).
- It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

Figure 1:
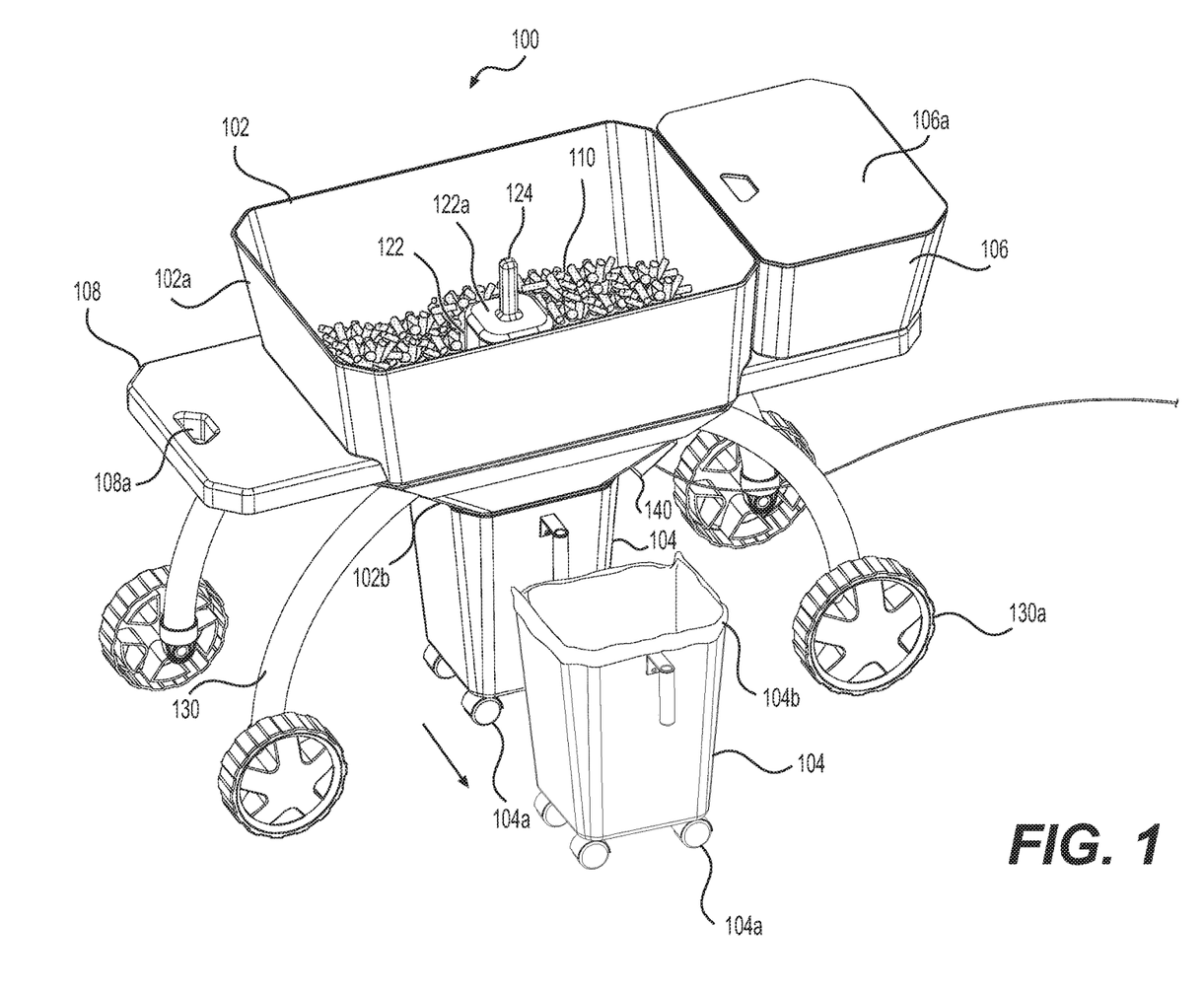
FIG. 1 is a perspective view of a litter box including a main compartment, a removable contaminant compartment, and an optional storage compartment, a frame supports the main compartment to allow easy removal of the contaminant compartment, and powderizable litter (e.g. wood pellet litter) is in the main compartment and the removable contaminant compartment is shown both in a use position and in a removal position.
Figure 2:
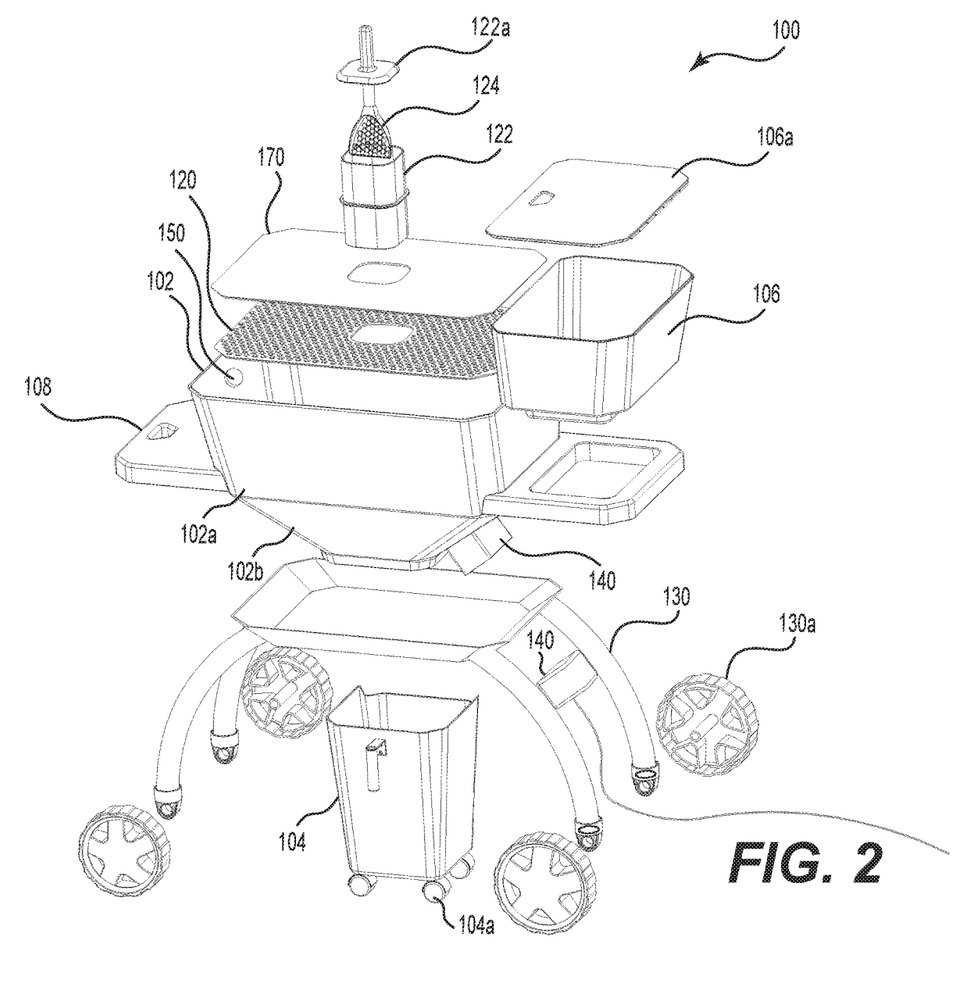
FIG. 2 is an exploded view of a litter box including a main compartment, a removable contaminant compartment, and an optional storage compartment, a frame supports the main compartment to allow easy removal of the contaminant compartment.

FIGS. 1 and 2 show a litter box 100 that includes a main compartment 102 (that is shown as being divided into a pellet sub-compartment 102a and a funnel sub-compartment 102b) and a removable contaminant compartment 104. The funnel sub-compartment 102b helps guide soiled powderized litter 110c and solid waste 112 toward the contaminant compartment 104. The removable contaminant compartment 104 is preferably separated from the main compartment 102 by a grate separator 120. It should be noted that there should be enough of a distance between the grate separator 120 and the bottom of the contaminant compartment 104 to allow for the storage of soiled powderizable litter 110c and solid waste 112 for a predetermined time. The litter box 100 may also include an optional storage compartment 106 (shown with a lid 106a) that may be used for storing new powderizable litter 110. An optional shelf 108 (that may have a handle 108a) may also be associated with the litter box 100. These figures also show a passage defined between the main compartment 102 and the contaminant compartment 104. More specifically, the passage is shown as a chute 122 through the grate separator 120. The chute 122 may have a lid 122a (that may help block odor). A separator 124 (shown as a perforated scoop) is shown as being integral with the lid 122a so that lifting the separator 124 also lifts the lid 122a. The separator 124 may be used to remove solid waste 112 from the powderizable litter 110 and then to deposit the solid waste 112 through the chute 122 and into the contaminant compartment 104. FIGS. 1 and 2 also show a frame 130 that may be used to support the main compartment 102 above the contaminant compartment 104. Further, the main compartment 102 is shown as being above the grate separator 120 and the contaminant compartment 104 is shown as being below the grate separator 120. The frame 130 also allows the contaminant compartment 104 to be moved out from under the main compartment 102. If the contaminant compartment 104 is on wheels 104a (as shown), the contaminant compartment 104 can easily be rolled from under the frame 130 supported main compartment 102 (a use position) to beyond the main compartment 102 (a removal position). If both the contaminant compartment 104 and the frame 130 have respective wheels 104a, 130a, then the entire litter box 100 can be rolled by the user. The litter box 100 shown in FIGS. 1 and 2 also includes an optional vibrator 140 and an optional sensor 150.

Figure 3:
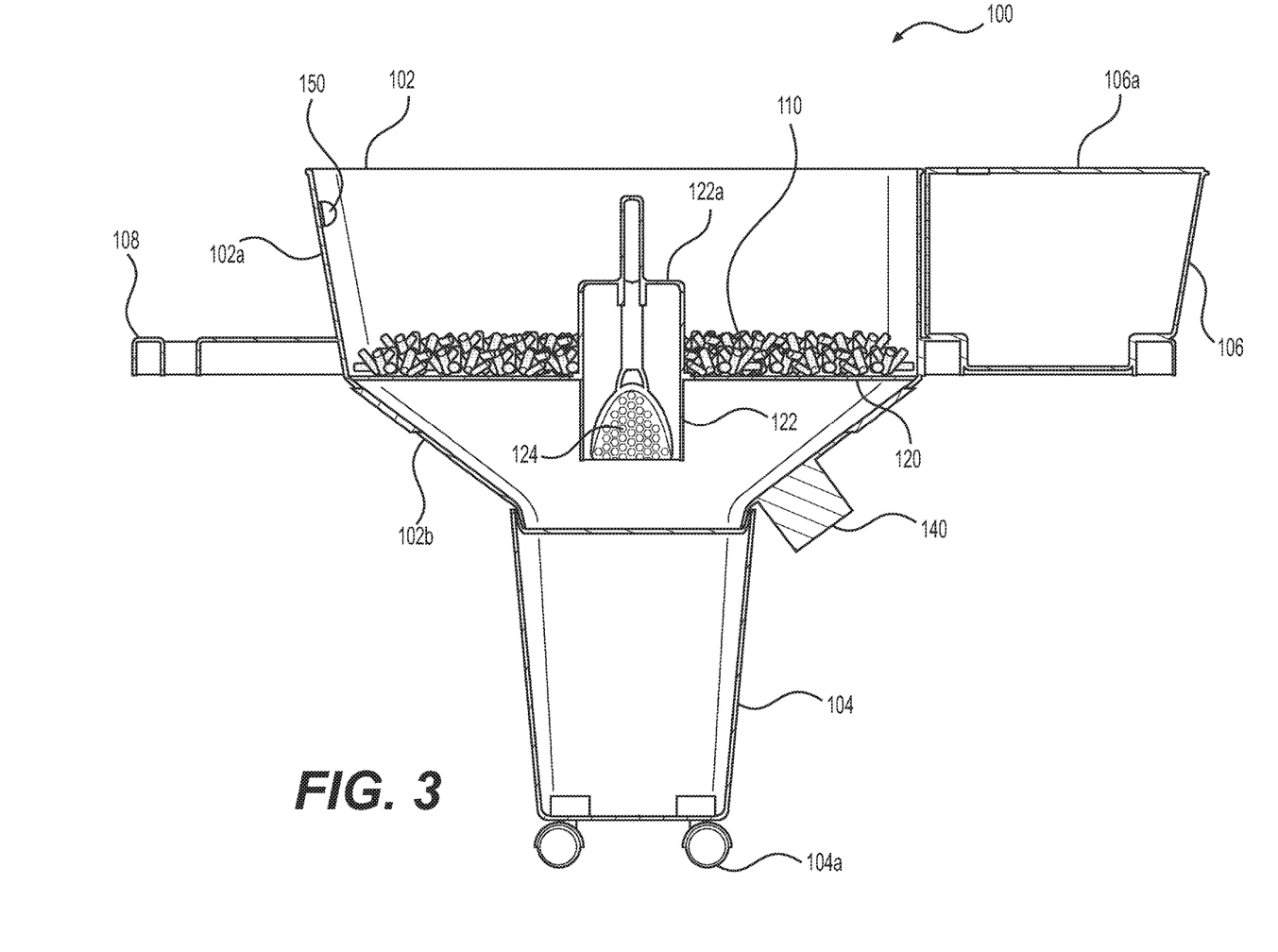
FIG. 3 is a cross-sectional view of a simplified litter box including a main compartment, a removable contaminant compartment, and an optional storage compartment.

FIG. 3 is a simplified version of the litter box 100 including a main compartment 102 (that is shown as being divided into a pellet sub-compartment 102a and a funnel sub-compartment 102b), a removable contaminant compartment 104, an optional storage compartment 106, an optional shelf 108, an optional vibrator 140, and an optional sensor 150. FIG. 3 omits the frame 130. FIG. 3 also shows a clear view of the passage defined between the compartment 102 and the removable contaminant compartment 104. More specifically, the passage is shown as a chute 122 through the grate separator 120. The chute 122 is shown as having a lid 122a. A separator 124 (shown as a perforated scoop) is shown as being integral with the lid 122a so that lifting the separator 124 also lifts the lid 122a. The separator 124 may be used to remove solid waste 112 from the powderizable litter 110 and then to deposit the solid waste 112 through the chute 122 and into the contaminant compartment 104.

Figure 4:
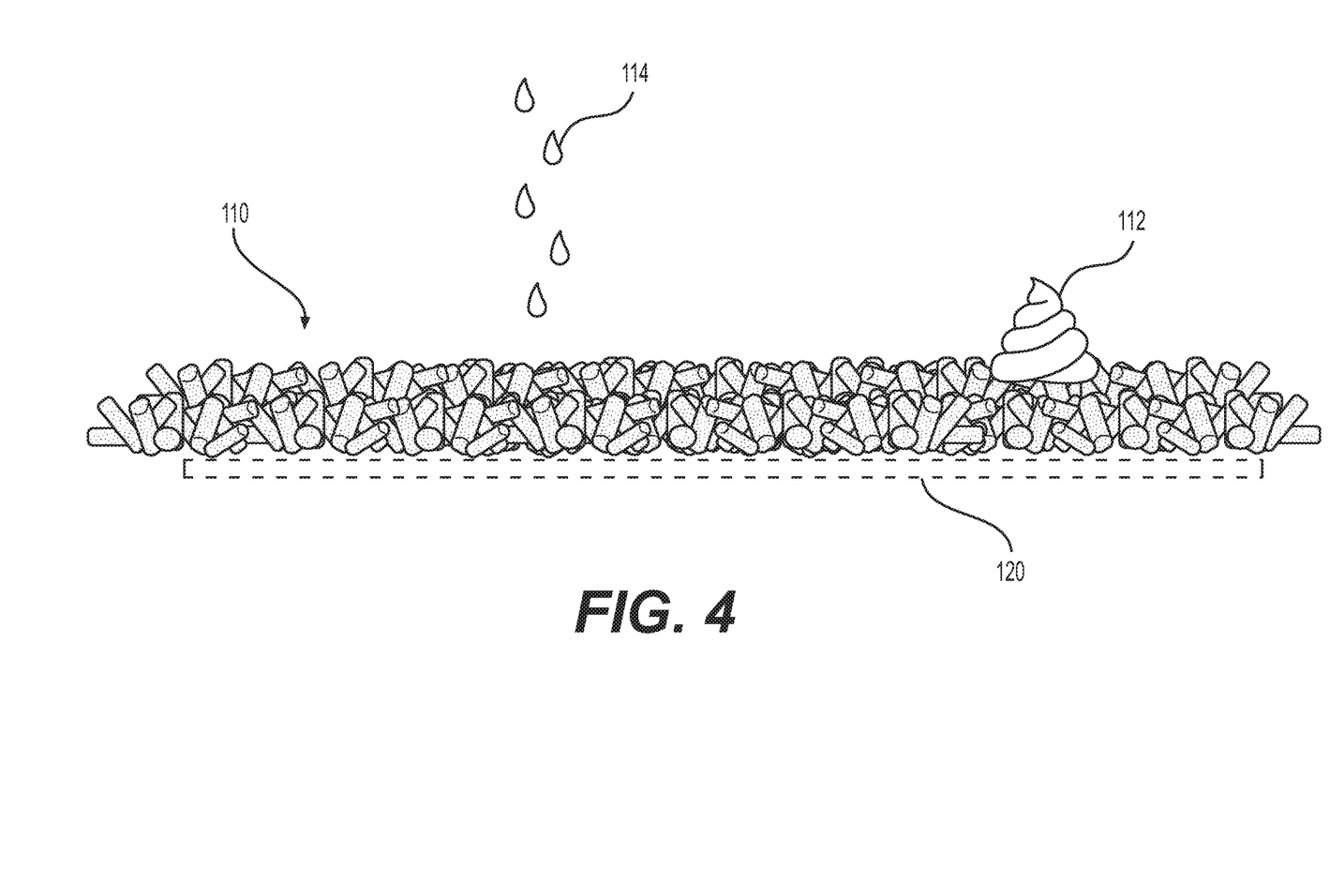
FIG. 4 is a detailed view of a grate of the main compartment, the grate separator supporting powderizable litter, solid waste being on the powderizable litter, liquid waste approaching the powderizable litter.
Figure 5:
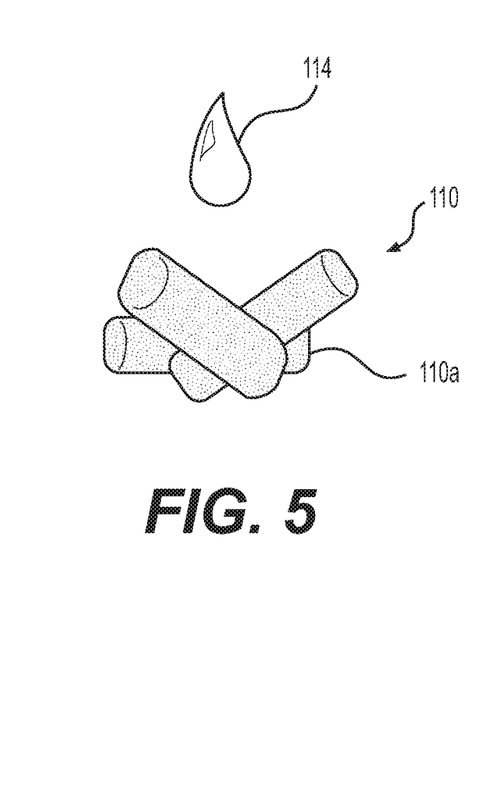
FIG. 5 is an enlarged view of liquid waste approaching the powderizable litter.
Figure 6:
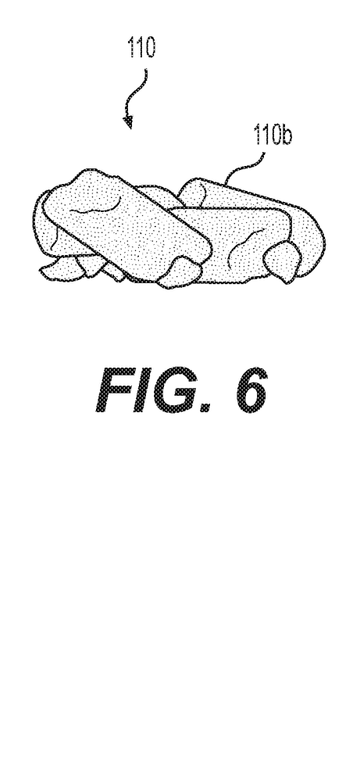
FIG. 6 is an enlarged view of powderizable litter after liquid waste is applied, the powderizable litter beginning to breakdown from its original pellet form to a sawdust (or powder) form.
Figure 7:
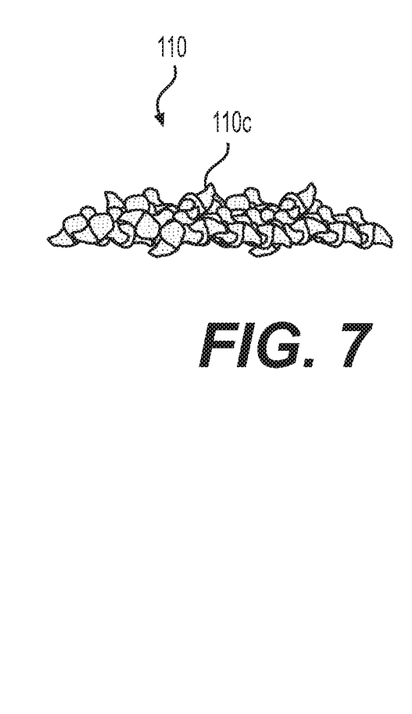
FIG. 7 is an enlarged view of powderizable litter in its sawdust (or powder) form.

FIGS. 4-7 show how the powderizable litter 110 reacts to liquid waste 114 (or any fluid). The powderizable litter 110 has multiple forms: a large initial form 110a (referred to generally as "pellet litter 110a"), an intermediary form 110b, and a small powder form 110c (referred to generally as "soiled powderized litter 110c"). (In these and other figures, the representations of the various forms of the powderized litter 110 have been enlarged for easy viewing and are not necessarily to scale.) FIG. 4 shows a grate separator 120 of the main compartment 102. The grate separator 120 is supporting the powderizable litter 110. Solid waste 112 is on the powderizable litter 110 and liquid waste 114 approaching the powderizable litter 110. FIGS. 5-7 show the progression of the powderizable litter 110 from initial pellet litter 110a (FIG. 5, before the litter 110 is exposed to the liquid waste 114), to an intermediary form 110b (FIG. 6, with the litter 110 beginning to break down), and finally to powderized litter 110c (FIG. 7, where all the litter 110 that has been exposed to the liquid waste 114 has been broken down).

Figure 8:
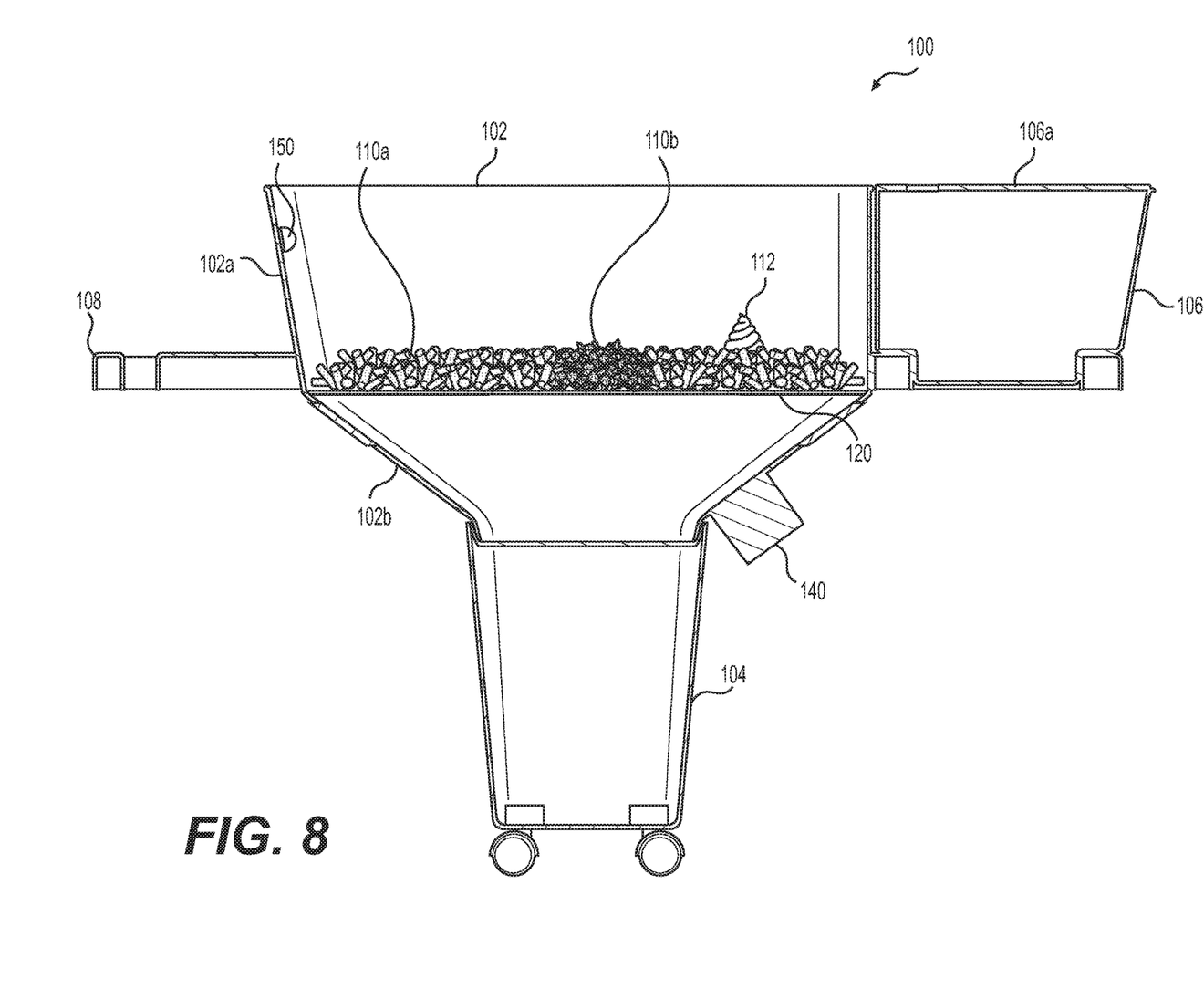
FIG. 8 is a cross-sectional view of a simplified litter box with powderizable litter after liquid waste is applied, the exposed powderizable litter being in its intermediary form.
Figure 9:
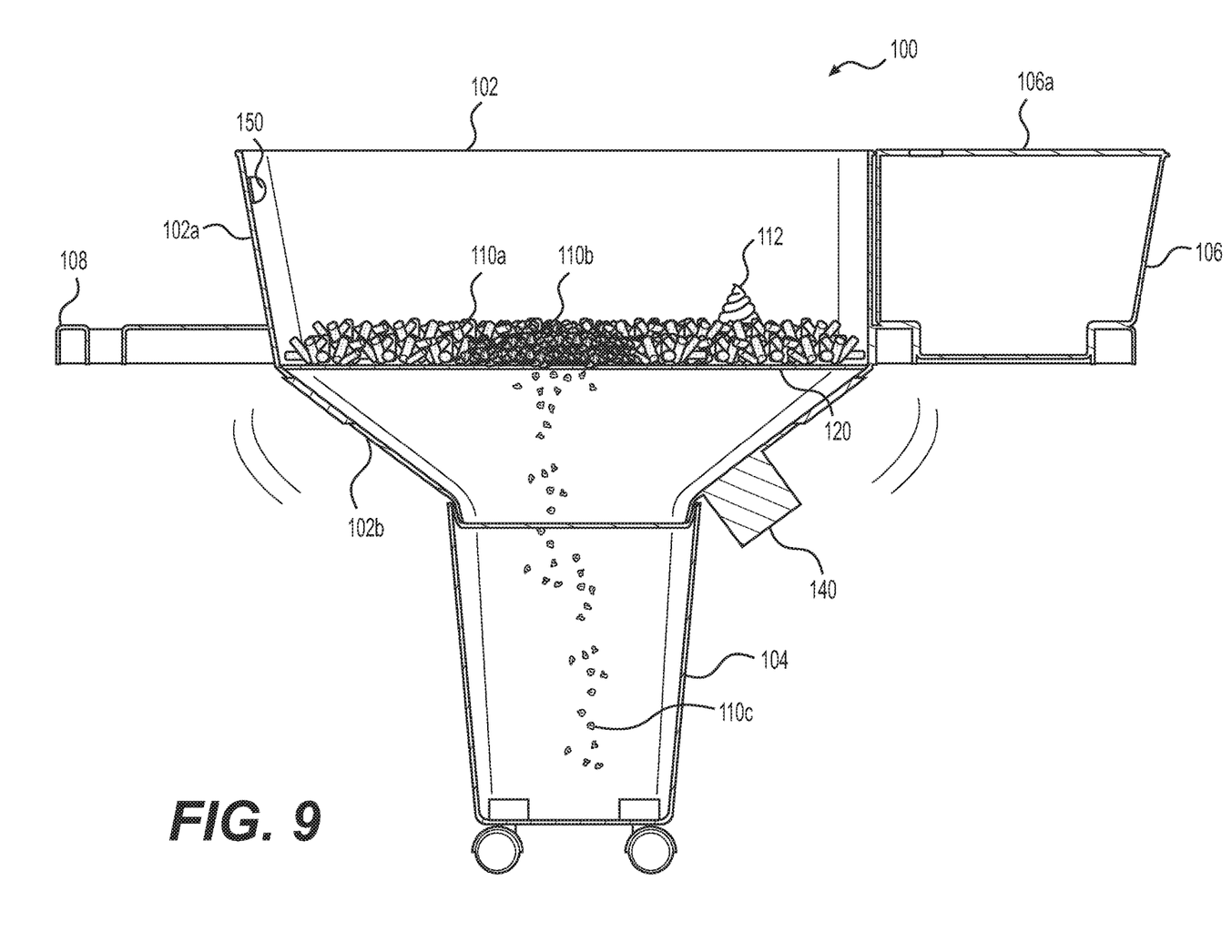
FIG. 9 is a cross-sectional view of a simplified litter box, the powderizable litter breaking down from the intermediary form to a sawdust (or powder) form, and vibration being applied to assist in the process of encouraging soiled powderized litter to fall through the grate separator and into the contaminant compartment.
Figure 10:
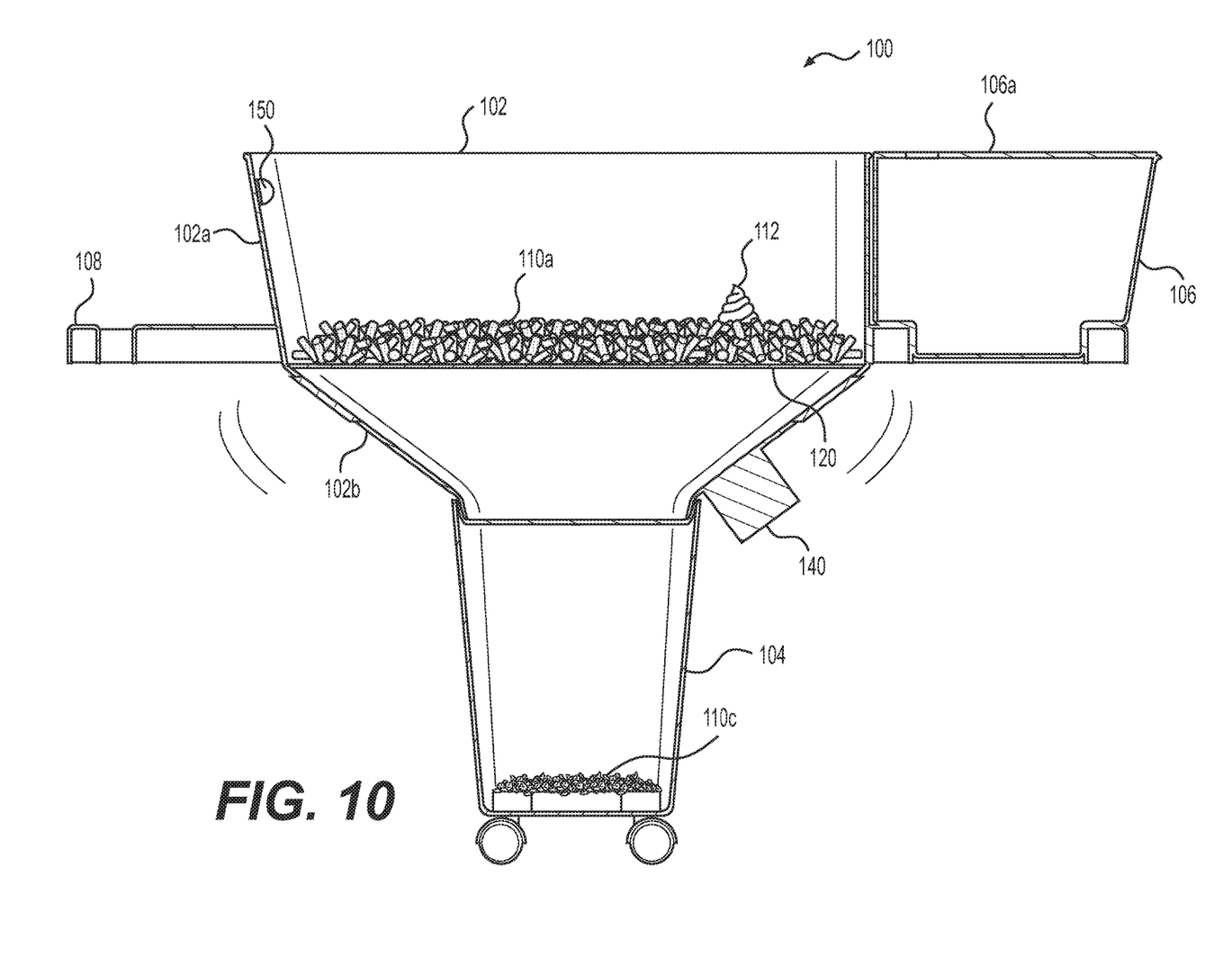
FIG. 10 is a cross-sectional view of a simplified litter box, the soiled powderized litter having fallen through the grate separator and into the contaminant compartment, the clean powderizable litter (in its original form) remains in the main compartment being essentially free from liquid waste.

FIGS. 8-10 show how the litter box 100 works with the powderizable litter 110. (FIGS. 8-10 show a simplified version of the litter box 100 with the chute 122 and separator 124 either in an alternative location and/or not shown.) FIG. 8 shows the powderizable litter 110 after liquid waste 114 is applied. As can be seen, some of the powderizable litter 110 is in the intermediary form 110b while the remainder (the unexposed portion) remains in its large initial form 110a. FIG. 9 shows the powderizable litter 110 breaking down from the intermediary form 110b to a sawdust (or powder) form (the soiled powderized litter 110c). FIG. 9 also shows vibration being applied to assist in the process of encouraging soiled powderized litter 110c to fall through the grate separator 120 and into the contaminant compartment 104. FIG. 10 shows the soiled powderized litter 110c having fallen through the grate separator 120 and into the contaminant compartment 104. The unexposed (clean) powderizable litter 110 remaining in the main compartment 102 in its large initial form 110a because it is essentially free from liquid waste. The layer of clean powderizable litter 110 covering the grate separator 120 acts as an odor barrier between the soiled powderized litter 110c and/or solid waste 112 in the contaminant compartment 104.

Figures 11, 12:
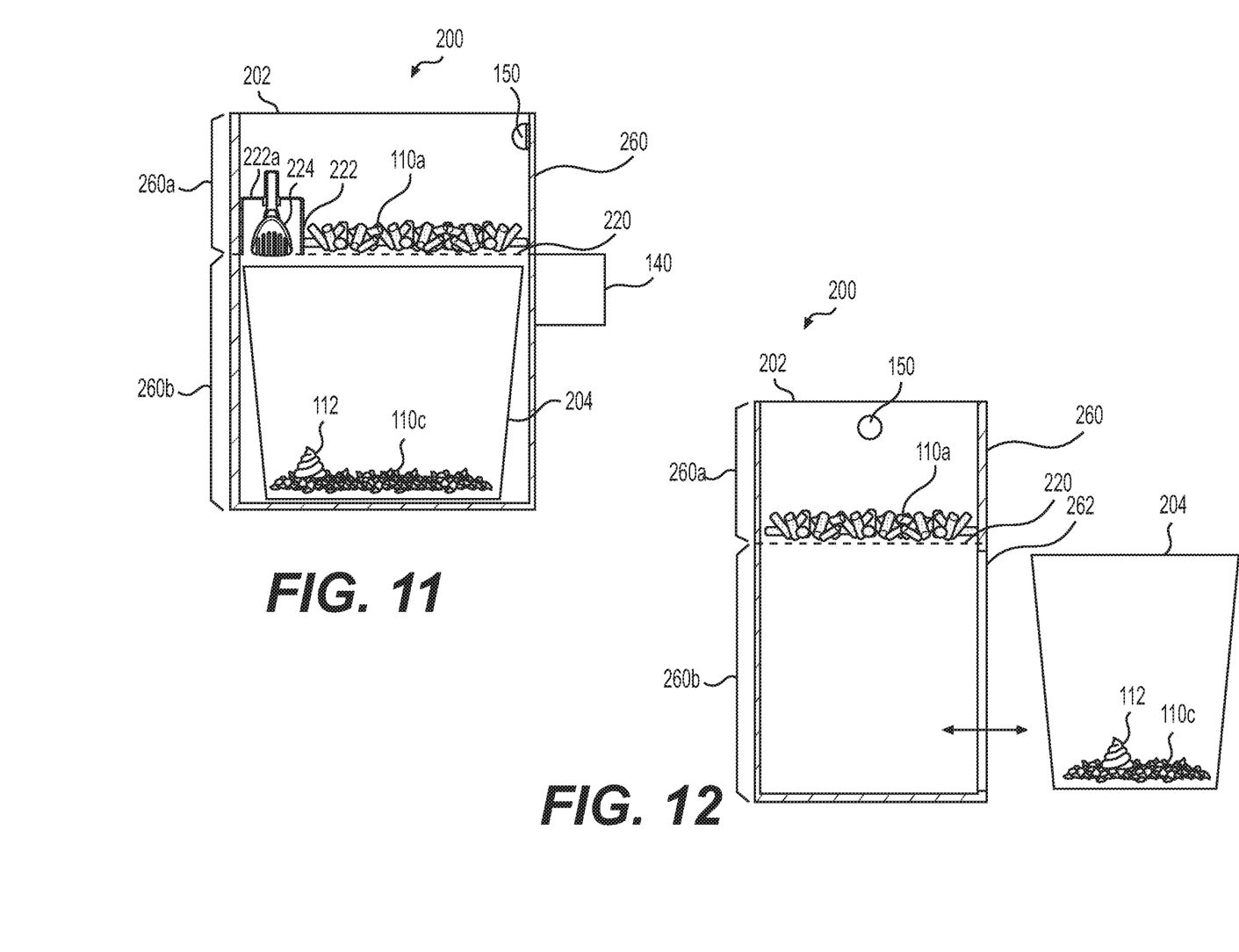
FIG. 11 is cross-sectional front view of an alternative litter box including a main compartment and a removable contaminant compartment, powderizable litter is in the main compartment and soiled litter is in the removable contaminant compartment, the removable contaminant compartment being shown in a use position.
FIG. 12 is cross-sectional side view of an alternative litter box including a main compartment and a removable contaminant compartment, powderizable litter is in the main compartment and soiled litter is in the removable contaminant compartment, the removable contaminant compartment being shown in a removal position.

FIGS. 11 and 12 show an alternative simplified litter box 200 that includes a main compartment 202 and a removable contaminant compartment 204. The removable contaminant compartment 204 is separated from the main compartment 202 by a grate separator 220. It should be noted that there should be enough of a distance between the grate separator 220 and the bottom of the contaminant compartment 204 to allow for the storage of soiled powderizable litter 110c and solid waste 112 for a predetermined time. FIG. 11 shows the removable contaminant compartment 204 being shown in a use position. FIG. 12 shows the removable contaminant compartment 204 being shown in a removal position. FIG. 11 shows a passage (shown as a chute 222 through the grate separator 220) defined between the main compartment 202 and the contaminant compartment 204. The chute 222 may have a lid 222a. A separator 224 (shown as a slotted rake) is shown as being integral with the lid 222a so that lifting the separator 224 also lifts the lid 222a. The separator 224 may be used to remove solid waste 112 from the powderizable litter 110 and then to deposit the solid waste 112 through the chute 222 and into the contaminant compartment 204.

This litter box 200 may be built into a cabinet 260 that is divided by the grate separator 220 into a top portion 260a and a bottom portion 260b. The top portion 260a of the cabinet 260 functions as the main compartment 202. The bottom portion 260b of the cabinet 260 functions as the frame 130 of the litter box 100 of FIGS. 1 and 2. More specifically, the bottom portion 260b supports the main compartment 202 above the contaminant compartment 204. Further, the main compartment 202 is shown as being above the grate separator 220 and the contaminant compartment 204 is shown as being below the grate separator 220. The bottom portion 260b also allows the contaminant compartment 204 to be moved out from under the main compartment 202. The bottom portion 260b may have a door 262. When the door 262 is open, the contaminant compartment 204 can be removed. When the door 262 is closed, the contaminant compartment 204 is hidden.

The litter box 200 shown in FIGS. 11 and 12 also includes an optional vibrator 140 and an optional sensor 150. Although not shown in FIGS. 11 and 12, there could be wheels on the contaminant compartment 204 and/or the bottom of the cabinet 260. The litter box 200 could also have storage compartment, a shelf, and/or other features discussed herein.

The shown vibrator 140 is used for vibrating at least the grate separator 120, 220 of the litter box 100, 200. The vibrator 140 could vibrate the entire litter box 100, 200. Any type of vibrator 140 may be used that has enough vibration to vibrate the litter box 100, 200 sufficiently to shake the main compartment 102, 202 to encourage the downward movement of the soiled powderized litter 110c through the grate separator 120, 220. One exemplary vibrator 140 is a NEA 5020 MARTIN® MICRO™ Rotary Electric Vibrator. Specific vibrators that could be used, however, would be determined based on factors such as the size and weight of the litter box 100, 200, as well as the specifications (e.g. vibration strength) of the vibrator. Although shown as a single vibrator, multiple vibrators may be used.

The shown sensor 150 is used for vibrating a litter box 100, 200. One type of sensor 150 that could be used is a motion-detecting sensor. If motion is detected, the sensor 150 sends a signal to the vibrator 140. The sensor 150, vibrator 140, or a controller (programmable unit) of the sensor and/or the vibrator would preferably incorporate a built in delay for actuating the vibration. For example, when the sensor 150 senses motion, it waits until the motion stops for two minutes and then signals the vibrator 140 to start vibrating. The reason for the delay would be to allow the animal to leave the litter box 100, 200 before starting the vibration. Instead of or in addition to a motion detecting sensor, other types of sensors that might be used include a light detecting sensor (detecting light being temporarily blocked by an animal), a break beam sensor (that detects a break in a beam as the animal crosses the beam), and/or any type of sensor that can sense the presence and/or absence of an animal in a litter box. Although shown as a single sensor, multiple sensors may be used.

Method of Use

An exemplary method for using the litter boxes 100, 200 includes the following exemplary steps.

First, powderizable litter 110 in its large initial form 110a is inserted into the main compartment 102, 202. Because the pellet litter 110a is larger than the apertures in the grate separator 120, 220, the grate separator 120, 220 supports the powderizable litter 110.

Next, an animal "uses" the litter box 100, 200 by depositing solid waste 112 and/or liquid waste 114 on the powderizable litter 110. This immediately causes the powderizable litter 110 to transform (breakdown) from a large initial form 110a (FIG. 5), to an intermediary form 110b (FIG. 6), and ultimately to a small powder form 110c (FIG. 7).

Preferably after the animal has left the litter box 100, 200 (for example, when a human user flips a switch or after a pre-determined delay), at least the grate separator 120, 220 (or, alternatively, the entire litter box 100, 200) is vibrated using a vibrator 140. (Alternatively, the litter box 100, 200 can be vibrated manually by shaking the litter box 100, 200.) During the vibration, the powderizable litter 110 that is in the small powder form 110c is able to pass through the apertures in the grate separators 120, 220 an into the contaminant compartment 104, 204. This effectively transfers the liquid waste 114 into the contaminant compartment 104, 204 as it has been absorbed by the powderizable litter 110 in the small powder form 110c which is now in the contaminant compartment 104, 204.

Solid waste 112 may be removed using a separator 124, 224 to transfer the solid waste 112 from the main compartment 102, 202 to the contaminant compartment 104, 204. The solid waste 112 may be inserted through a passage (that may be a chute 122, 222 between the main compartment 102, 202 and the contaminant compartment 104, 204).

The contaminant compartment 104, 204 may be emptied by removing the contaminant compartment 104, 204 from below the main compartment 102, 202. In the shown preferred embodiments, the contaminant compartment 104, 204 is slid out from below the main compartment 102, 202. After the contaminant compartment 104, 204 is emptied, it can be repositioned below the main compartment 102, 202. In preferred litter boxes 100, 200, both the removal and replacement can be accomplished without significantly moving the main compartment 102, 202.

ADDITIONAL FEATURES AND VARIATIONS

One feature of the litter boxes 100, 200 described herein is the significant savings that can be achieved. As set forth in the Background, a month's worth of clumping litter for a single cat may cost between $10 and $40. As also set forth in the Background, assuming that all the wood pellet litter must be removed and replaced on a daily basis, a month's worth of wood pellet litter for a single cat using a traditional system may cost between $4 and $12. This savings is accomplished (at least in part) because the wood pellet litter is significantly less expensive than clumping litter. On the other hand, a month's worth of powderizable litter 110 using the litter boxes 100, 200 described herein for a single cat will result in additional savings. Part of this saving is the lower cost of the wood pellet litter. In addition, the liquid waste 114 infused soiled powderized litter 110c passes through the grate separator 120, 220 and into the contaminant compartment 104, 204. This means that there is very little waste. Also, because most (if not all) of the liquid waste 114 infused soiled powderized litter 110c passes through the grate separator 120, 220, the clean powderizable litter 110 does not need to be replaced as often (if at all).

The components of the litter box 100, 200 may be made from and/or lined with many different materials including, but not limited to, metals, plastics, and/or any materials that have sufficient strength and the relevant properties to perform the purposes for which they are used. Further, the materials should resist staining, odor, bacteria, rust, or other undesirable problems. The materials from which the structures are made may be moldable.

It should be noted that any of the contaminant compartments 104, 204 may be lined with a bag 104b (FIG. 1) that may easily be removed and replaced. There may also be components or structure (not shown) associated with the main compartment 102, 202, the contaminant compartment 104, 204, and/or other parts of the litter box 100, 200 that guide the placement of the contaminant compartment 104, 204, limit the movement of the contaminant compartment 104, 204, and/or lock (or at least latch) the contaminant compartment 104, 204 into position so that it is not moved accidentally.

The statement that the main compartment 102, 202 is above the contaminant compartment 104, 204 is meant to include variations in which a significant portion of (but not necessary the entire) the main compartment 102, 202 is above the contaminant compartment 104, 204. Further, the statement that the contaminant compartment 104, 204 is below the main compartment 102, 202 is meant to include variations in which a significant portion of (but not necessary the entire) the contaminant compartment 104, 204 is below the main compartment 102, 202. For example, although the main compartment 102, 202 is shown as being completely above the contaminant compartment 104, 204, alternative variations could have a majority of the main compartment 102, 202 being above the contaminant compartment 104, 204 or a majority of the contaminant compartment 104, 204 being below the main compartment 102, 202. Further, the main compartment 202 is shown as being above the grate separator 220 and the contaminant compartment 204 is shown as being below the grate separator 220.

As set forth above, there should be enough of a distance between the grate separator 120, 220 and the bottom of the contaminant compartment 104, 204 to allow for the storage of soiled powderizable litter 110c and solid waste 112 for a predetermined time. This gap between the grate separator 120, 220 and the bottom of the contaminant compartment 104, 204 is a significant difference from known nesting multi-pan systems in which a first pan with a perforated bottom surface nests with a second pan with a solid bottom surface. A frame used to support a main compartment 102, 202 can be used to help create the gap, but the gap could also be created with structure or attachment means on the main compartment 102, 202 and/or the contaminant compartment 104, 204. A smaller litter box 100, 200 that had, for example, a smaller distance between the grate separator 120, 220 and the bottom of the contaminant compartment 104, 204 would have less storage space in the contaminant compartment 104, 204 and, therefore, would require more frequent emptying. Similarly, a larger litter box 100, 200 that had, for example, a larger distance between the grate separator 120, 220 and the bottom of the contaminant compartment 104, 204 would have more storage space in the contaminant compartment 104, 204 and, therefore, would require less frequent emptying. Although exemplary distances between the grate separator 120, 220 and the bottom of the contaminant compartment 104, 204 may be between 6 inches and 24 inches, other distances are possible.

It should be noted that a training plate 170 (FIG. 2) may be used to help train an animal to use the litter box 100, 200. Using the training plate 170, a litter that the cat is familiar with can be used in the litter box 100, 200 until the animal is comfortable with the litter box 100, 200. The powderizable litter 110 can then be mixed with the animal's familiar litter. When only the powderizable litter 110 is being used, the training plate 170 may be removed.

The shown grate separators 120, 220 are substantially planar (although they could be slightly angled, convex, concave, and/or conical) and have openings therein. The actual grates could be made of many different materials including, but not limited to, metals, plastics, and wire (e.g. a wire netting). The grate would have to be sturdy enough to support the powderizable litter 110 and the animal (e.g. cat). It should be made of a material that resists staining, odor, bacteria, rust, or other undesirable problems. The openings in the grate separators 120, 220 would be sized to prevent the majority of the powderizable litter 110 in its pellet litter 110a form from passing through the openings, but would allow the powderizable litter 110 in its small powder form 110c to pass through the openings. The size, therefore, would be dependent on the size of the powderizable litter 110 both in its large initial form 110a and in its small powder form 110c. As an example, however, the openings may have an average diameter of between 1/16 inch and 1/4 inch.

Although shown as single chutes 122, 222 in the figures, each passage (there may be a plurality of passages) may be any type of connection (including a hole or void, an opening door, and/or swinging lid (similar to older style trash cans)) into the contaminant compartment 104, 204 through which solid waste 112 may be inserted. The passage is preferably between the main compartment 102, 202 and the contaminant compartment 104, 204, but alternative placements are possible.

The exemplary chutes 122, 222 are shown as extending above the anticipated level of the powderizable litter 110. This extension has the advantage of making it easier to find the chutes 122, 222 when it is needed. Also, by extending above the powderizable litter 110, when a lid 122a, 222a is removed from its chute 122, 222, clean powderizable litter 110 cannot inadvertently fall through the passage.

The exemplary chute 122 of FIGS. 1-3 is shown as being centrally located in the grate separator 120. FIG. 11 shows an exemplary alternative location for the chute 222 as being along the edge of the litter box 200. Alternative locations could include the chute being located along other edges, or even outside of the litter box. The chutes 122, 222 may have lids 122a, 222a. The shown separators 124, 224 are shown as being integral with the lids 122a, 222a so that lifting the separators 124, 224 also lifts the respective lid 122a, 222a. The separators 124, 224 could also be distinct from the lids.

Finally, although the shown separators are manual separators (e.g. scoops or rakes), alternative litter boxes could use automated separators such as the automated separators described in some of the references described in the Background. Such an automated system might include a rake that automatically moved from side to side of the main compartment 102, 202, gathered solid waste, and deposited the solid waste through a passageway into the contaminant compartments 104, 204.

It should be noted that the shown frame 130 is meant to be exemplary. Any structure could be used that holds the main compartment 102 in a raised position. The frame is also optional in that a user could lift the main compartment 102 off the contaminant compartment 104. Although not shown, a barrier (e.g. door or cover) could be used to cover the bottom of the main compartment 102 if the main compartment 102 is to be lifted and moved.

The vibrator 140 is optional. The powderizable litter 110 in the contaminant compartment 102, 202 is supported by the grate separator 120, 220 when the powderizable litter 110 is in a large initial form 110a. However, gravity acts on the powderizable litter 110 in the contaminant compartment 102, 202 when it is transformed to its small powder form 110c to cause the small powder form 110c to drop through the grate separator 120, 220 into the contaminant compartment 104, 204. The vibrator 140 is also optional because theoretically the user could shake the litter box 100, 200. However, the vibrator 140 is unique because known litter boxes would have no reason for vibrating. If known litter boxes vibrated, either the solid bottom surface would prevent anything from falling, or if clumping litter was used, all that would be left on the top is the solid waste and the clumped litter. It is the unique configuration and/or purpose of the litter boxes 100, 200 described herein that makes vibration a desired feature. If the vibrator 140 is powered, it may be powered by being plugged in (FIGS. 1 and 2) or it may be powered using batteries (FIGS. 3 and 8-11).

The sensor 150 is optional because the vibrator 140 could be activated by the user (using a toggle or on/off switch) or on a timer (either at predetermined intervals (e.g. every eight hours), at times set by the user (e.g. at noon and at midnight), and/or randomly).

At least one "processing unit" (or controller) may control the vibrator and/or sensor (or other automated features described herein). The processing unit(s) is/are directed (or controlled) by at least one vibrator and/or sensor program (or subprogram) loaded into and/or stored in at least one associated "memory." The processing unit(s) may be as processor(s) (or other known or yet to be discovered processing device) capable of implementing steps or actions or directing (directly or indirectly) other components to implement steps or actions. Memory is any computer-readable storage media including non-transitory memory (e.g. RAM memory, flash memory, ROM memory, EPROM memory, EEPROM memory, registers, hard disk, a removable disk, a CD-ROM, a USB drive, or any other form of known or yet to be discovered storage media means). Exemplary programs (or subprograms) may be implemented as software or other forms of computer instructions (e.g. computer-readable program code) that may be loaded into computer memory to produce a machine, such that the instructions that execute on the computer create structures for implementing the steps, actions, or functions described herein. The processing unit(s) (or controller(s)) may receive input from the vibrator(s) and/or the sensor(s).

Having the entire system supported on wheels allows the user to move (roll) easily the liter box if needed. Having the entire system raised allows a user to change the litter without stooping. In most situations, the litter boxes described herein will need significantly less cleaning as compared to known litter boxes.

The features and variations described herein may be implemented with litter box versions even if those features and variations are not specifically discussed in relation to the litter box versions. For example, although the training plate 170 is discussed only in relation to the litter box shown in FIG. 2, a training plate could be used with the litter box shown in FIGS. 11 and 12. Another example would be that a frame (e.g. the frame 130 of FIGS. 1 and 2) might be used with litter boxes shown herein without a frame.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

All references (including, but not limited to, publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A litter box comprising:
   (a) a main compartment;
   (b) a contaminant compartment;
   (c) a grate separator dividing said main compartment and said contaminant compartment such that at least the majority of said main compartment is above said grate separator and at least the majority of said contaminant compartment is below said grate separator; and
   (d) a chute creating a passage through said grate separator between said main compartment and said contaminant compartment;
   (e) wherein powderizable litter in a large initial form in said main compartment is supported by said grate separator, and powderizable litter that has transformed to a small powder form in said main compartment drops through said grate separator into said contaminant compartment leaving clean powderizable litter in said large initial form in said main compartment.

2. The litter box of claim 1, said contaminant compartment being a removable contaminant compartment.

3. The litter box of claim 1, further comprising a frame for supporting said main compartment above said contaminant compartment.

4. The litter box of claim 1, further comprising a vibrator for vibrating at least said grate separator.

5. The litter box of claim 1, wherein powderizable litter in said contaminant compartment supported by said grate separator provides an odor barrier.

6. The litter box of claim 1, wherein said powderizable litter transforms from said large initial form to said small powder form when liquid waste is introduced to the powderizable litter.

7. A litter box comprising:
   (a) a main compartment;
   (b) a contaminant compartment;
   (c) a grate separator dividing said main compartment and said contaminant compartment such that at least the majority of said main compartment is above said grate separator and at least the majority of said contaminant compartment is below said grate separator; and
   (d) a passage defined into said contaminant compartment, said passage being a chute through said grate separator between said main compartment and said contaminant compartment;
   (e) wherein powderizable litter in a large initial form in said main compartment is supported by said grate separator, and powderizable litter that has transformed to a small powder form in said main compartment drops through said grate separator into said contaminant compartment leaving clean powderizable litter in said large initial form in said main compartment.

8. The litter box of claim 7, said contaminant compartment being a removable contaminant compartment.

9. The litter box of claim 7, further comprising a frame for supporting said main compartment above said contaminant compartment.

10. The litter box of claim 7, further comprising a vibrator for vibrating at least said grate separator.

11. A litter box comprising:
    (a) a main compartment;
    (b) a removable contaminant compartment;
    (c) a grate separator dividing said main compartment and said contaminant compartment such that at least the majority of said main compartment is above said grate separator and at least the majority of said contaminant compartment is below said grate separator;
    (d) a passage defined through said grate separator between said main compartment and said contaminant compartment, said passage being a chute; and
    (e) a vibrator for vibrating at least said grate separator;
    (f) wherein powderizable litter in a large initial form in said main compartment is supported by said grate separator, and powderizable litter that has transformed to a small powder form in said main compartment drops through said grate separator into said contaminant compartment leaving clean powderizable litter in said large initial form in said main compartment.

12. The litter box of claim 11, further comprising a frame for supporting said main compartment above said contaminant compartment.

13. A litter box comprising:
    (a) an elevated main compartment;
    (b) a grate forming the floor of said main compartment; and
    (c) a chute creating a passage through said grate separator from above said main compartment and to below said main compartment;
    (d) wherein powderizable litter in a large initial form in said main compartment is supported by said grate, and powderizable litter that has transformed to a small powder form in said main compartment drops through said grate leaving clean powderizable litter in said large initial form in said main compartment.

14. The litter box of claim 13, further comprising a frame for supporting said main compartment in an elevated position.

15. The litter box of claim 13, further comprising a wheeled frame for supporting said main compartment in an elevated position.

* * * * *